(12) United States Patent
Girt et al.

(10) Patent No.: US 8,709,619 B2
(45) Date of Patent: *Apr. 29, 2014

(54) LOW-COUPLING OXIDE MEDIA (LCOM)

(75) Inventors: Erol Girt, San Jose, CA (US); Hans Jurgen Richter, Palo Alto, CA (US); Mariana R. Munteanu, Santa Clara, CA (US); Thomas Nolan, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,553

(22) Filed: Aug. 31, 2012

(65) Prior Publication Data

US 2013/0045394 A1    Feb. 21, 2013

Related U.S. Application Data

(63) Continuation of application No. 12/963,244, filed on Dec. 8, 2010, now Pat. No. 8,257,844, which is a continuation of application No. 12/272,662, filed on Nov. 17, 2008, now Pat. No. 7,867,637.

(51) Int. Cl.
*G11B 5/66* (2006.01)

(52) U.S. Cl.
USPC ........................................ 428/828.1

(58) Field of Classification Search
None
See application file for complete search history.

(56) References Cited

U.S. PATENT DOCUMENTS

| | | | |
|---|---|---|---|
| 4,103,315 A | 7/1978 | Hempstead et al. | |
| 4,262,116 A | 4/1981 | Johnson | |
| 4,404,609 A | 9/1983 | Jones, Jr. | |
| 4,442,159 A | 4/1984 | Dezawa et al. | |
| 4,636,448 A | 1/1987 | Morita et al. | |
| 4,642,270 A | 2/1987 | Morita et al. | |
| 4,643,942 A | 2/1987 | Ohtsubo | |
| 4,649,073 A | 3/1987 | Suzuki et al. | |
| 4,652,479 A | 3/1987 | Suzuki et al. | |
| 4,763,215 A | 8/1988 | Gueugnon et al. | |
| 4,982,301 A | 1/1991 | Endo | |
| 5,094,925 A | 3/1992 | Ise et al. | |
| 5,196,976 A | 3/1993 | Lazzari | |
| 5,224,080 A | 6/1993 | Ohtsuki | |
| 5,325,343 A | 6/1994 | Ohtsuki | |
| 5,329,413 A | 7/1994 | Kondoh et al. | |
| 5,343,449 A | 8/1994 | Miyata | |
| 5,347,485 A | 9/1994 | Taguchi et al. | |

(Continued)

FOREIGN PATENT DOCUMENTS

JP   62134817   6/1987
JP   11-296833  10/1999

(Continued)

OTHER PUBLICATIONS

Office Action from the United States Patent and Trademark Office for U.S. Appl. No. 12/272,662, dated Oct. 2, 2009.

(Continued)

*Primary Examiner* — Holly Rickman
(74) *Attorney, Agent, or Firm* — Alan G. Rego; Westman, Champlin & Koehler, P.A.

(57) ABSTRACT

A low-coupling perpendicular magnetic recording media comprising a magnetic storage layer and at least one low saturation magnetization layer. The magnetic storage layer has a saturation magnetization between about 400-900 emu/cm3 and the at least one low saturation magnetization layer has a saturation magnetization below that of the magnetic storage layer.

18 Claims, 3 Drawing Sheets

(56) References Cited

U.S. PATENT DOCUMENTS

| | | |
|---|---|---|
| 5,486,967 A | 1/1996 | Tanaka et al. |
| 5,525,398 A | 6/1996 | Takai et al. |
| 5,567,523 A | 10/1996 | Rosenblum et al. |
| 5,636,093 A | 6/1997 | Gijs et al. |
| 5,640,374 A | 6/1997 | Hirokane et al. |
| 5,644,566 A | 7/1997 | Nakayama et al. |
| 5,659,537 A | 8/1997 | Hirokane et al. |
| 5,703,795 A | 12/1997 | Mankovitz |
| 6,117,011 A | 9/2000 | Lvov |
| 6,183,893 B1 | 2/2001 | Futamoto et al. |
| 6,280,813 B1 | 8/2001 | Carey et al. |
| 6,327,227 B1 | 12/2001 | Katayama |
| 6,430,115 B1 | 8/2002 | Hirokane et al. |
| 6,468,670 B1 | 10/2002 | Ikeda et al. |
| 6,495,252 B1 | 12/2002 | Richter et al. |
| 6,534,203 B2 | 3/2003 | Iwasaki et al. |
| 6,602,612 B2 | 8/2003 | Abarra et al. |
| 6,602,621 B2 | 8/2003 | Matsunuma et al. |
| 6,777,730 B2 | 8/2004 | Daughton et al. |
| 7,314,675 B1 | 1/2008 | Nolan |
| 7,572,527 B2 | 8/2009 | Fullerton et al. |
| 7,701,667 B2 | 4/2010 | Tamai et al. |
| 7,736,765 B2 | 6/2010 | Wu et al. |
| 2004/0219329 A1 | 11/2004 | Oikawa et al. |
| 2004/0247943 A1 | 12/2004 | Girt et al. |
| 2005/0227122 A1 | 10/2005 | Takahashi et al. |
| 2006/0139799 A1 | 6/2006 | Wu et al. |
| 2006/0269792 A1 | 11/2006 | Fullerton et al. |
| 2007/0188924 A1 | 8/2007 | Tamai et al. |
| 2007/0243418 A1 | 10/2007 | Fullerton et al. |
| 2007/0275269 A1 | 11/2007 | Takahoshi et al. |
| 2008/0180843 A1 | 7/2008 | Zhang et al. |

FOREIGN PATENT DOCUMENTS

| | | |
|---|---|---|
| JP | 2003-317230 | 11/2003 |
| JP | 2006-155861 A | 6/2006 |
| JP | 2006-309922 | 11/2006 |
| JP | 2007-184066 A | 7/2007 |
| JP | 2007-317304 | 12/2007 |
| JP | 2008-103048 A | 5/2008 |
| JP | 2008103048 | 5/2008 |
| JP | 2008-176858 | 7/2008 |
| JP | 2008269789 | 11/2008 |
| WO | 2006046732 | 5/2006 |

OTHER PUBLICATIONS

Final Office Action from the United States Patent and Trademark Office for U.S. Appl. No. 12/272,662, dated Jun. 28, 2010.

Final Office Action from the United States Patent and Trademark Office for U.S. Appl. No. 12/963,244, dated Sep. 9, 2011.

Notice of Allowance from the United States Patent and Trademark Office for U.S. Appl. No. 12/963,244, dated Jun. 21, 2012.

Office Action from the United States Patent and Trademark Office for U.S. Appl. No. 12/963,244, dated Mar. 18, 2011.

Office Action from the United States Patent and Trademark Office for U.S. Appl. No. 12/963,244, dated Mar. 15, 2012.

International Search Report and Written Opinion for International Application No. PCT/US2009/064615, dated Feb. 3, 2010.

Written Opinion from the Intellectual Property Office of Singapore for Singapore Patent Application No. 201103222-4, dated May 25, 2012.

Notice of Allowance from the United States Patent and Trademark Office for U.S. Appl. No. 12/272,662, dated Sep. 10, 2010.

First Office Action for Japanese Patent Application No. 2011-536562, dated Jan. 14, 2014, 3 pages.

First Office Action for Japanese Patent Application No. 2012-248355, dated Jan. 14, 2014, 3 pages.

Examination Report under Section 183) for Great Britain Patent Application No. GB1109691.4, dated Feb. 12, 2014, 4 pages.

LOW-COUPLING OXIDE MEDIA (LCOM)

CROSS-REFERENCE TO RELATED APPLICATION

The present application is a continuation of and claims priority of U.S. patent application Ser. No. 12/963,244, filed Dec. 8, 2010, which is a is a continuation of and claims priority of U.S. patent application Ser. No. 12/272,662, filed Nov. 17, 2008, now U.S. Pat. No. 7,867,637, the contents of which are hereby incorporated by reference in their entirety.

BACKGROUND

Magnetic discs with magnetizable media are used for data storage in most computer systems. According to the domain theory, a magnetic material is composed of a number of submicroscopic regions called domains. Each domain contains parallel atomic moments and is magnetized to saturation, but the directions of magnetization of different domains are not necessarily parallel. In the absence of an applied magnetic field, adjacent domains may be oriented randomly in any number of several directions, called the directions of easy magnetization, which depend on the geometry of the crystal. The resultant effect of all these various directions of magnetization may be zero, as is the case with an unmagnetized specimen. When a magnetic field is applied, the domains most nearly parallel to the direction of the applied field grow in size at the expense of the others. This is called boundary displacement of the domains or domain growth. A further increase in magnetic field causes more domains to rotate and align parallel to the applied field. When the material reaches the point of saturation magnetization, no further domain growth would take place on increasing the strength of the magnetic field.

The ease of magnetization or demagnetization of a magnetic material depends on the crystal structure, grain orientation, the state of strain, and the direction and strength of the magnetic field. The magnetization is most easily obtained along an easy axis of magnetization and most difficult along the hard axis of magnetization. A magnetic material is said to possess a magnetic anisotropy when easy and hard axes exist. On the other hand, a magnetic material is said to be isotropic when there are no easy or hard axes.

Many prior art magnetic recording media were fabricated with a longitudinal configuration. That is, the recording media were fabricated with in-plane (longitudinal) anisotropy in the magnetic layer. Longitudinal anisotropy results in magnetization forming in a direction in a plane parallel to the surface of the magnetic layer.

The demand for higher capacity magnetic recording media, however, has resulted in interest in perpendicular recording media; that is, recording media with a perpendicular anisotropy in the magnetic layer resulting in magnetization forming in a direction perpendicular to the surface of the magnetic layer. Typically, perpendicular recording media are fabricated with a polycrystalline CoCr alloy or CoPt-oxide alloy film. Co-rich areas in the polycrystalline film are ferromagnetic while Cr or oxide rich areas in the film are non-magnetic. Magnetic interaction between adjacent ferromagnetic domains are attenuated by the non-magnetic areas in between.

SUMMARY

One embodiment of this invention relates to a low-coupling perpendicular magnetic recording media comprising a magnetic storage layer and at least one low saturation magnetization layer, wherein the magnetic storage layer has a saturation magnetization between about 400-900 emu/cm$^3$ and the at least one low saturation magnetization layer has a saturation magnetization below that of the magnetic storage layer.

BRIEF DESCRIPTION OF THE DRAWINGS

The present invention will be better understood by reference to the Detailed Description of the Invention when taken together with the attached drawings, wherein.

DETAILED DESCRIPTION OF THE PREFERRED EMBODIMENTS OF THE INVENTION

As used in the specification and claims, the singular forms "a", "an" and "the"" include plural references unless the context clearly dictates otherwise.

The inventors have discovered that a weak uniform direct exchange coupling between magnetic grains in perpendicular recording media provides improved performance. The inventors have further discovered that weak uniform direct exchange coupling between the magnetic grains may be produced by adding a low saturation magnetization magnetic layer(s) in the perpendicular media structure. The inventors have additionally discovered that the strength of the direct exchange coupling can be controlled by varying saturation magnetization ($M_S$) of the magnetic layer.

An embodiment of this invention relates to a low-coupling perpendicular magnetic recording media comprising at least one low saturation magnetization layer, wherein the at least one low saturation magnetization layer has a saturation magnetization below 600 emu/cm$^3$.

Another embodiment of the invention relates to a method of making a low-coupling perpendicular magnetic recording media comprising depositing an adhesion layer on a substrate, depositing a soft underlayer, depositing an non-magnetic interlayer, depositing a storage layer; and depositing a low saturation magnetization magnetic layer, wherein the at least one low saturation magnetization layer has a saturation magnetization below 600 emu/cm$^3$.

Another embodiment of the invention relates to a method comprising obtaining a storage media having at least one layer with a saturation magnetization below Additional advantages of this invention will become readily apparent to those skilled in this art from the following detailed description, wherein only a selection of preferred embodiments of this invention are shown and described, to illustrate the best modes contemplated for carrying out this invention. As will be realized, this invention may comprise other and different embodiments, and its details are capable of modifications in various obvious respects, all without departing from this invention. Accordingly, the drawings and description are to be regarded as illustrative in nature and not as restrictive.

EXAMPLES

All samples described in this disclosure were fabricated with DC magnetron sputtering except carbon films. Example data demonstrating the reduction of exchange coupling by reactive sputtering are explained herein.

Figure 1:
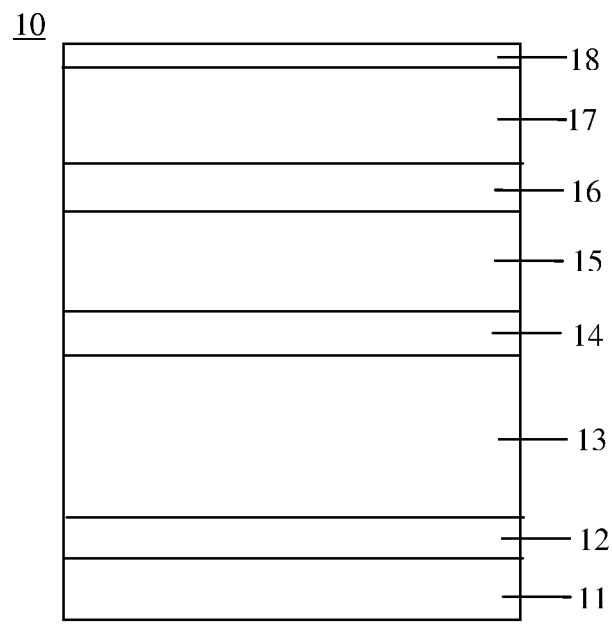
FIG. 1 shows a magnetic recording medium according to one embodiment of the invention.

FIG. 1 illustrates a first preferred embodiment of the invention. The low-coupling perpendicular magnetic recording media 10 of this embodiment includes a substrate 11, an adhesion layer 12, a soft under layer 13, an amorphous layer 14, a non-magnetic interlayer 15, a low-coupling magnetic layer 16, a storage layer 17, and a carbon protective overcoat. Optionally, the soft under layer 13, the amorphous layer 14, the non-magnetic interlayer 15, the low-coupling magnetic layer 16, the storage layer 17, and the carbon protective overcoat 18 may comprise multiple layers.

Preferred materials for the optional adhesion layer 12 include alloys containing one or more of Cr, Ni, Ta, and Ti. The choice depends on the substrate 11 and the material selected for the soft underlayer 13 and is within the skill of one of ordinary skill in the art. Preferably, the thickness of the adhesion layer is about 1-400 nm. More preferably, the thickness is about 2-20 nm.

Preferred materials for the soft underlayer 13 include alloys of at least one of Fe and Co with one or more elements selected from Ni, B, P, Si, C, Zr, Nb, Hf, Ta, Al, Si, Cu, Ag, Au. Preferably, the thickness of the soft underlayer 13 is about 10-400 nm. More preferably, the thickness is about 20-100 nm.

The amorphous layer 14 is optional. Preferred materials for the amorphous layer 14 include elements and alloys comprising Ta, Ti, Ni, Cr, Zr, Nb, and P, in compositions for which these alloys are amorphous. Other preferred materials include amorphous ferromagnetic materials consisting of Fe with one or more elements selected from Co, B, P, Si, C, Zr, Nb, Hf, Ta, Al, Si, Cu, Ag, and Au. Still other preferred materials include $Ti_xCr_{100-x}$ and $Ta_xCr_{100-x}$, where $(30<x<60)$. Preferably, the thickness of the amorphous layer 14 is about 0-10 nm. More preferably the thickness is about 0.2-4 nm.

The crystallographic structure of the non-magnetic interlayer 15 depends on the crystallographic structure of the storage layer 17. For example, if the storage layer 17 is made of a Co-rich alloy with a hexagonal closed packed (hcp) structure, the non-magnetic interlayer 15 may include a face-centered cubic (fcc) layer of Cu, Ag, Au, Ir, Ni, Pt, Pd, or their alloys. Preferably, the thickness of this non-magnetic interlayer 15 ranges from about 0.2 nm to about 40 nm. More preferably, the thickness is about 1-20 nm. Alternatively, the non-magnetic interlayer 15 may include a hexagonal closed packed (hcp) layer of Ru, Re, Hf, Ti, Zr, or their alloys. Other hcp layers that may be used include Co and CoCr alloys. Optional additives to CoCr include Ta, B, Pt, Nb, Ru, Zr, and oxide materials. To use CoCr, the concentration of Cr and other alloying elements is chosen so that the alloy is non-magnetic and has an hcp crystal structure. To use Co-containing alloys the concentration of Cr and other alloying elements is chosen so that the alloy is non-magnetic and has an hcp crystal structure. Preferably, the thickness of the hcp layer(s) ranges from about 0.2 nm to 40 nm. More preferably, the thickness is about 1-20 nm.

The storage layer 17 may comprise one layer or any number of layers of magnetic material. Preferred materials for the storage layer 17 include Co with one or more elements selected from Pt, Cr, Ta, B, Cu, W, Mo, Ru, Ni, Nb, Zr, Hf. Optionally, one or more oxides of elements such as Si, Ti, Zr, Al Cr, Co, Nb, Mg, Ta, W, or Zn may also be present in the storage layer 17. Preferably, the storage layer 17 is grown in a controlled atmosphere. Preferably, the controlled atmosphere includes Ar, Kr, or Xe or combination of these gasses with a reactive gas component such as O2. The storage layer 17 may be grown at low temperatures, i.e. below 400 K. Typically, low temperatures are used for fabricating magnetic layers sputtered in controlled atmospheres including combinations of Ar, Kr, Xe and $O_2$. Alternatively, the storage layer 17 may be grown at elevated temperatures, i.e. above 400 K. Preferably, the elevated temperature is higher than 420 K and below 600 K.

In the present embodiment, the low-coupling magnetic layer 16 is located between non-magnetic interlayer 15 and the storage layer 17. In this embodiment, the crystallographic structure of the low-coupling magnetic layer 16 may be adjusted to improve the crystallographic growth of the storage layer 17. For example, for a storage layer(s) 17 with an hcp crystallographic structure, a low-coupling magnetic layer(s) 16 may be selected to have an hcp or fcc crystallographic structure, or it may be amorphous. Preferred materials for the low-coupling magnetic layer 16 include at least one of Fe, Co, Ni with one or more elements selected from Cr, Pt, Ta, B, Ru, Cu, Ag, Au, W, Mo, Nb, Zr, Hf, Ti, Zn, and Re. Preferably, the low-coupling magnetic layer 16 has a lower Ms than the Ms of the storage layer 17 to obtain weak direct exchange coupling. The storage layer 17 preferably has a Ms of approximately 400-900 $emu/cm^3$. The low-coupling magnetic layer 16 preferably has a Ms less than or equal to about 600 $emu/cm^3$. More preferably Ms is less than or equal to about 300 $emu/cm^3$. Even more preferably, Ms is less than or equal to about 50 $emu/cm^3$. Possible storage layer 17/low-coupling magnetic layer 16 combinations may be, but are not limited to: 600/300, 900/600, 500/50, 450/350, 600/450 and 900/400.

The topmost layer covering the low-coupling perpendicular magnetic recording media 10 of this embodiment is the carbon protective overcoat 18. The thickness of the carbon protective overcoat 18 may vary according to the desired life and durability of the low-coupling perpendicular magnetic recording media 10.

Figure 2:
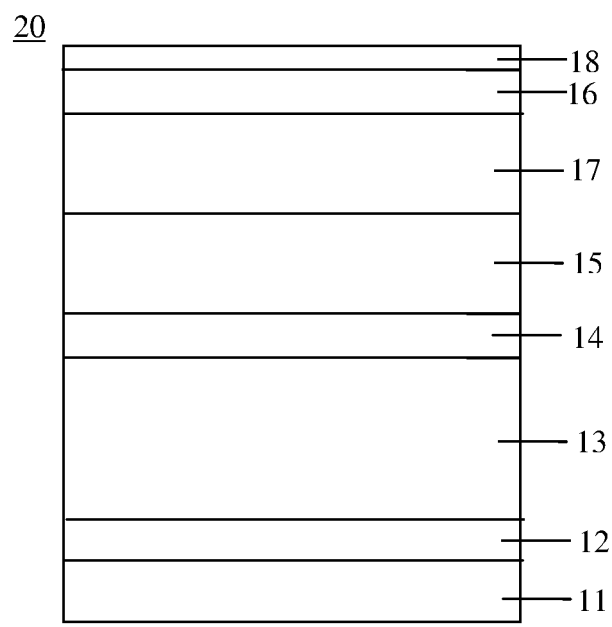
FIG. 2 shows a magnetic recording medium according to another embodiment of the invention.

FIG. 2 illustrates a second preferred embodiment of the invention. The low-coupling perpendicular magnetic recording media 20 of this embodiment includes a substrate 11, an adhesion layer 12, a soft under layer 13, an amorphous layer 14, an non-magnetic interlayer 15, a storage layer 17, a low-coupling magnetic layer 16, and a carbon protective overcoat. That is, in contrast to the first embodiment, the low-coupling magnetic layer 16 is between the storage layer 17 and the carbon protective overcoat. Further, as in the first embodiment, the soft under layer 13, the amorphous layer 14, the non-magnetic interlayer 15, the storage layer 17, the low-coupling magnetic layer 16, and the carbon protective overcoat 18 may include multiple layers.

Figure 3:
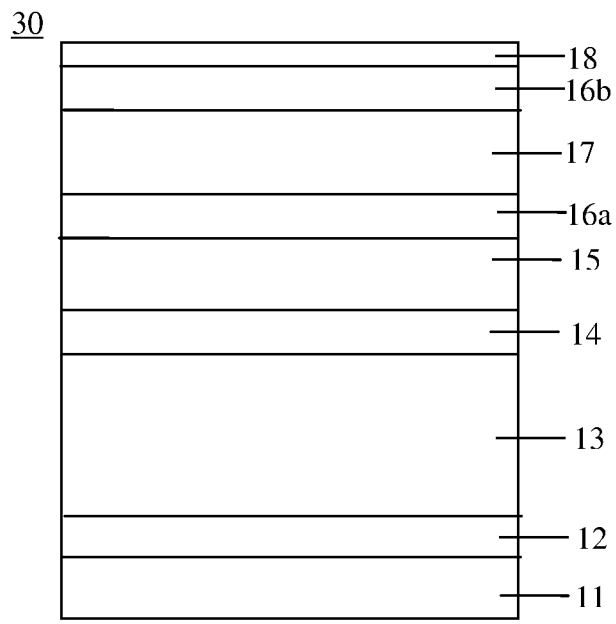
FIG. 3 shows a magnetic recording medium according to a third embodiment of the invention.

FIG. 3 illustrates a third preferred embodiment of the invention. The low-coupling perpendicular magnetic recording media 30 of this embodiment includes a substrate 11, an adhesion layer 12, a soft under layer 13, an amorphous layer 14, an non-magnetic interlayer 15, a first low-coupling magnetic layer 16a, a storage layer 17, a second low-coupling magnetic layer 16b, and a carbon protective overcoat. In contrast to the first embodiment, the low-coupling magnetic layer 16 comprises at least two layers that are separated by at least one storage layer 17. Further, the soft underlayer 13, the amorphous layer 14, the non-magnetic interlayer 15, the first low-coupling magnetic layer 16a, the storage layer 17, the second low-coupling magnetic layer 16b, and the carbon protective overcoat 18 may include multiple layers.

Figure 4:
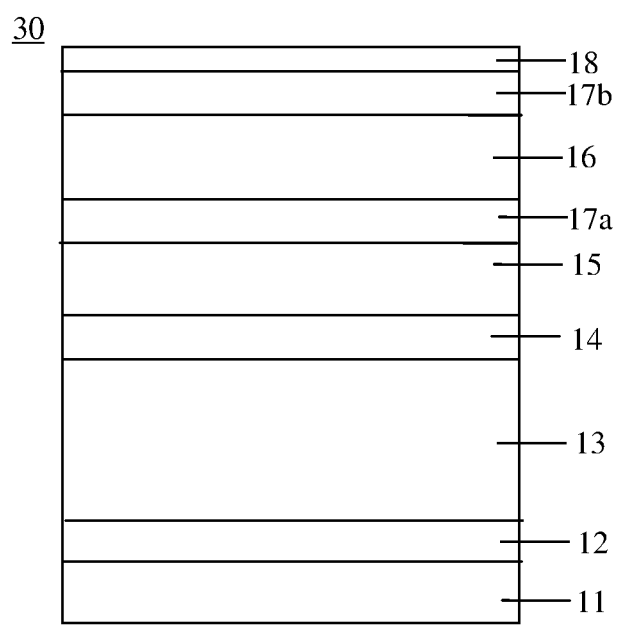
FIG. 4 shows a magnetic recording medium according to a fourth embodiment of the invention.

FIG. 4 illustrates a fourth preferred embodiment of the invention. The low-coupling perpendicular magnetic recording media 30 of this embodiment includes a substrate 11, an adhesion layer 12, a soft under layer 13, an amorphous layer 14, an non-magnetic interlayer 15, a low-coupling magnetic layer 16, a first storage layer 17a, a second storage layer 17b, and a carbon protective overcoat. In contrast to the first embodiment, the storage layer 17 comprises at least two layers that are separated by at least one low-coupling magnetic layer 16. Further, the soft underlayer 13, the amorphous layer 14, the non-magnetic interlayer 15, the first low-coupling magnetic layer 16, the first storage layer 17a, the second storage layer 17b, and the carbon protective overcoat 18 may include multiple layers.

Figure 5:
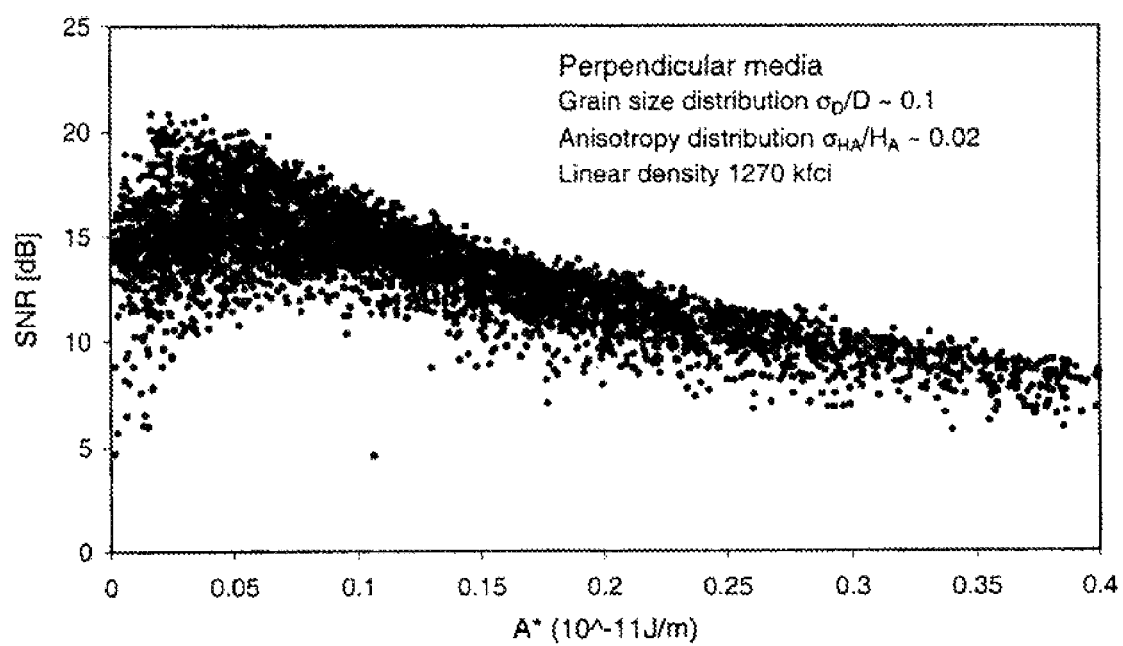
FIG. 5 illustrates Monte Carlo simulations demonstrating improved recording properties of an embodiment of the invention.

FIG. 5 illustrates Monte Carlo simulations demonstrating improved recording properties of an embodiment of the invention having a thick low-coupling magnetic layer of hcp crystallographic structure with $M_S$=50 emu/cm³ located between a non-magnetic interlayer 15 and a storage layer 17. In particular, the Monte Carlo simulations illustrated in FIG. 5 show that optimal recording properties of perpendicular media can be achieved for media with very low and uniform direct exchange coupling (A*), wherein A* comprises a value of $A^* \approx (0.05 \pm 0.03)*10^{-11}$ J/m (FIG. 5). Such a low value of direct exchange coupling results from most sputtered Co-alloy thin films having low saturation magnetization in a range of about 50 emu/cc<$M_S$<300 emu/cc. Assumptions for the simulations include: a grain size dispersion of $\sigma_D \approx 0.1$, where $\sigma_D/D$ describes a microstructure comprising a grain size defined by an average grain diameter (D) and a variation of grain size defined by a standard deviation ($\sigma_D$); anisotropy dispersion $\sigma_{HA}/H_A \approx 0.02$, where $H_A$ is the average anisotropy field of grains comprising the media and $\sigma_{HA}$ is the standard deviation of the anisotropy field; and linear density of 1270 kfci. Approximate values of $\sigma_D/D$ and $\sigma_{HA}/H_A$ can be experimentally obtained by microscopy techniques such as TEM and SEM, and magnetometry techniques such as Berger's method and AC transverse susceptibility respectively. Linear density is simply related to the length of each bit that is controlled by the recording process.

Similar model result trends to those shown for the specified model calculation parameters are obtained for a range of values of the model calculation parameters. Based on the results of the simulations, the inventors have determined that an additional low magnetization magnetic layer(s) 16 in perpendicular media structure provides lower exchange coupling between magnetic layers and grains in perpendicular media, which will significantly improve the performance. By varying $M_S$ of the low magnetization magnetic layer 16, the strength of direct exchange coupling in perpendicular recording media can be controlled. Simulations demonstrate that the location of the low magnetization magnetic layer 16 can be between the non-magnetic interlayer 15 and the storage layer 17, or between the storage layer 17 and the carbon protective overcoat 18. Alternatively, the low magnetization magnetic layer 16 may be located between or adjacent to a plurality of storage layers 17, e.g., 17a and 17b shown in FIG. 4. Alternatively, the low magnetization magnetic layer 16 may comprise a plurality of low magnetization layers, such as layers 16a, 16b shown in FIG. 3, which can be located between the interlayer 15 and the storage layer 17 and between the storage layer 17 and the carbon protective overcoat 18. Preferably, $M_S$ of low magnetization magnetic layer 16 is low, i.e. below about 600 emu/cm³ to provide low exchange coupling. More preferably, $M_S$ is below about 300 emu/cm³. Even more preferably, $M_S$ is below about 50 emu/cm³. The implementations described above and other implementations are within the scope of the following claims.

What is claimed is:

1. An apparatus comprising:
   a layered structure comprising:
      a first magnetic storage layer;
      a second magnetic storage layer spaced apart from the first magnetic storage layer by a spacing; and
      a low saturation magnetization layer, which comprises at least one of Fe, Co, or Ni, in the spacing between the first magnetic storage layer and the second magnetic storage layer to directly exchange couple the first magnetic storage layer and the second magnetic storage layer, the low saturation magnetization layer having a saturation magnetization level below that of the first and second magnetic storage layers.

2. The apparatus of claim 1 wherein the low saturation magnetization layer has a saturation magnetization level below that of the first and second magnetic storage layers by at least about 100 emu/cm³.

3. The apparatus of claim 2 wherein the low saturation magnetization layer has a saturation magnetization level less than or equal to about 300 emu/cm³.

4. The apparatus of claim 1 wherein the low saturation magnetization layer has a saturation magnetization level below that of the first and second magnetic storage layers by at least about 250 emu/cm³.

5. The apparatus of claim 4 wherein the low saturation magnetization layer has a saturation magnetization level less than or equal to about 50 emu/cm³.

6. The apparatus of claim 1 wherein each of the first magnetic storage layer and the second magnetic storage layer comprises a magnetic layer comprising Co and one or more elements selected from the group consisting of Pt, Cr, Ta, B, Cu, W, Mo, Ru, Ni, Nb, Zr, Hf.

7. The apparatus of claim 1 wherein each of the first magnetic storage layer and the second magnetic storage layer comprises one or more oxides selected from group consisting of oxides of Si, Ti, Zr, Al, Cr, Co, Nb, Mg and Zn.

8. The apparatus of claim 1 wherein the low saturation magnetization layer comprises the at least one of Fe, Co, or Ni with one or more elements selected from the group consisting of Cr, Pt, Ta, B, Ru, Cu, Ag, Au, W, Mo, Nb, Zr, Hf, Ti, Zn, and Re.

9. An apparatus comprising:
   a layered structure comprising:
      a first magnetic storage layer;
      a second magnetic storage layer spaced apart from the first magnetic storage layer by a spacing; and
      a low saturation magnetization layer, which comprises at least one of Fe, Co, or Ni, in the spacing between the first magnetic storage layer and the second magnetic storage layer to produce low and uniform directly exchange coupling between the first magnetic storage layer and the second magnetic storage layer, the low saturation magnetization layer having a saturation magnetization level below that of the first and second magnetic storage layers.

10. The apparatus of claim 9 and wherein the direct exchange coupling comprises a value of about $(0.05 \pm 0.03)*10^{-11}$ J/m.

11. The apparatus of claim 9 and wherein each of the first magnetic storage layer and the second magnetic storage layer has a saturation magnetization level between about 400-900 emu/cm³.

12. The apparatus of claim 9 and wherein the low saturation magnetization layer has a saturation magnetization level less than or equal to about 50 emu/cm³.

13. The apparatus of claim 9 and wherein the low saturation magnetization layer has a saturation magnetization level below that of the first and second magnetic storage layers by at least about 100 emu/cm$^3$.

14. An apparatus comprising:
a layered structure comprising:
a first magnetic storage layer;
a second magnetic storage layer spaced apart from the first magnetic storage layer by a spacing; and
a low saturation magnetization layer, which comprises at least one of Fe, Co, or Ni, in the spacing between the first magnetic storage layer and the second magnetic storage layer to directly exchange couple the first magnetic storage layer and the second magnetic storage layer,
wherein the first magnetic storage layer and the second magnetic storage layer each has a saturation magnetization level that is substantially higher than that of the low saturation magnetization layer.

15. The apparatus of claim 14, wherein the low saturation magnetization layer has a hexagonal closed packed (hcp) crystallographic structure.

16. The apparatus of claim 14 wherein each of the first magnetic storage layer and the second magnetic storage layer comprises a magnetic layer comprising Co and one or more elements selected from the group consisting of Pt, Cr, Ta, B, Cu, W, Mo, Ru, Ni, Nb, Zr, Hf.

17. The apparatus of claim 14 wherein each of the first magnetic storage layer and the second magnetic storage layer comprises one or more oxides selected from group consisting of oxides of Si, Ti, Zr, Al, Cr, Co, Nb, Mg and Zn.

18. The apparatus of claim 14 wherein the low saturation magnetization layer comprises the at least one of Fe, Co, or Ni with one or more elements selected from the group consisting of Cr, Pt, Ta, B, Ru, Cu, Ag, Au, W, Mo, Nb, Zr, Hf, Ti, Zn, and Re.

* * * * *